3,585,041
PROCESS FOR LOWERING AFLATOXIN LEVELS IN AFLATOXIN-CONTAMINATED SUBSTANCES
Godfrey E. Mann, New Orleans, Louis P. Codifer, Jr., and Homer K. Gardner, Jr., Metairie, and Frank G. Dollear, Pearl River, La., assignors to The United States of America as represented by the Secretary of Agriculture
No Drawing. Filed July 23, 1968, Ser. No. 746,741
Int. Cl. A23k 3/00; A23l 1/20
U.S. Cl. 99—2     3 Claims

ABSTRACT OF THE DISCLOSURE

This invention relates to a process for lowering the aflatoxin level in an agricultural product contaminated with aflatoxin which comprises mixing said product with methyl amine and holding said mixture in a closed vessel at atmospheric pressure at a temperature about from 75° to 100° C. for a period sufficient to cause substantial lowering of aflatoxin.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for lowering the aflatoxin contents in those substances containing aflatoxins. Further objects of the invention will be evident from the following disclosure wherein parts and percentages are by weight unless otherwise indicated. The abbreviation "p.p.b." used herein means parts per billion.

Recently, it has been recognized that agricultural products may become infected with strains of the mold *Aspergillus flavus* which product a group of highly toxic substances known collectively as aflatoxins. In England, 100,000 turkey poults died in 1960 because they consumed rations containing a peanut meal infected with *A. flavus*.

The extreme toxicity of aflatoxins is demonstrated by tthe fact that the $LD_{50}$ of the $B_1$ component (one of the main toxic components of the aflatoxin) is less than 30 micrograms for day-old ducklings. Furthermore, aflatoxin has produced pathological changes in a wide variety of animal species including trout, poultry, rats, cattle, dogs, swine, and monkeys.

Also, it has been reported that toxic substances, the aflatoxins M, are secreted in the milk of cows fed rations contaminated with aflatoxins B and G, thus revealing an indirect potential hazard to humans consuming the milk from these animals. This appears to be one of the more serious aspects of the problem.

Another serious aspect of the problem is that the responsible mold is ubiquitous and is liable to infect agricultural commodities of all kinds, particularly if they are exposed to warm and humid conditions. Typical of the commodities which have been found to be contaminated with aflatoxin are peanuts, peanut meal, cottonseed meal, corn, wheat, etc.

The primary objective of this invention is the provision of procedures whereby such contaminated materials may be rendered fit for their conventional uses. For example, contaminated seed meals may be rendered suitable for use as animal feeds. Basically, the elimination of aflatoxin in accordance with the invention is carried out by contacting the contaminated material with methyl amine. The primary advantage of the invention is its effectiveness in destroying aflatoxin. Another advantage is that the procedure is simple and the only reagent required is methyl amine. Furthermore, effective elimination of aflatoxin can be accomplished under atmospheric pressure, thus eliminating the need for pressurized equipment such as autoclaves. Also, after completion of the treatment, residual methyl amine can be readily eliminated because of its volatile nature. A last point is that the treatment in accordance with the invention does not cause a marked deterioration of the material treated. For example, feed materials subjected to the process of the invention retain the bulk of their nutritive value and hence are useful in animal feeding.

As briefly noted above, the aflatoxin elimination is accomplished by contacting the contaminated material with methyl amine. The treatment may be conducted at ambient temperatures. However, the rate of elimination of aflatoxins is very slow at these lower temperatures, and if it is desired to accelerate the elimination, the treatment is accompanied by the application of heat, for example, the material plus added methyl amine is held at an elevated temperature, for instance at 100° C. In general, therefore, the treatment in accordance with the invention may be carried out at temperatures in the range of about from 75 to 100° C.

The methyl amine may be applied as such, that is, as gaseous, anhydrous $CH_3NH_2$. Also, it may be applied in aqueous solution, i.e., as $CH_3NH_2$ solutions containing from 25 to 40% of the anhydrous reagent. To prevent undue loss of methyl amine, the treatment is conducted in a suitably closed vessel provided with a reflux condenser system to return moisture and displaced reagent to the material. To prevent possible pollution of the atmosphere, gases from the reflux system are conducted to a stack or hood for dilution with air and dispersion.

In general, the methyl amine is employed in large excess as compared with the amount of aflatoxin in the material being treated. Usually, one uses a minimum of about 0.6% anhydrous $CH_3NH_2$ based upon the weight of the material being treated. To ensure adequate aflatoxin elimination it is preferred to use a larger proportion of methyl amine, for example, 1.0–1.5% anhydrous $CH_3NH_2$.

The time of treatment will depend on various factors including the amount of aflatoxin in the starting material, the concentration of methyl amine in the system, the physical and chemical properties of the material (for example, the particle size of the material, its porosity or density, its content of fats, its moisture content, etc.), and particularly on the temperature employed. For example, in typical runs with aflatoxin-contaminated cottonseed meats it has been found that the treatment may require seven days at room temperature whereas at 100° C., a marked reduction in aflatoxin is accomplished in about 60–120 minutes. Since the time of treatment depends on so many factors, it is impossible to set forth numerical time limits which will be applicable to all cases. In any particular application, the optimum time of treatment can readily be ascertained by applying the treatment for different time periods to pilot samples of the material and conducting chemical assays on the products. (These can be carried out by chromatographic methods known in the art.) The resulting data will indicate which treatment time gives optimum results and this can then be applied to the main batch of material to be processed.

It has been observed that the presence of moisture increases the rate and degree of aflatoxin elimination. Accordingly, it is desirable that moisture be present when materials are treated with methyl amine in accordance with the invention. For mixture effectiveness of treatment, the moisture level in the material should be about from 15 to 30%. For materials that are inherently moist, the addition of methyl amine as an aqueous solution will generally result in the addition of sufficient water to elevate the moisture content of the desired level. If the material has a low moisture content, i.e., about from 5 to 7%, it generally will be necessary to supply additional water to the material so that the total moisture level is in the desired range. The amount of addition water required can be calculated easily from the initial moisture content of the material, the amount of aqueous methyl amine added, and the water content of the methyl amine solution.

After treatment of the material with methyl amine as hereinabove described, the material is treated to remove methyl amine and excess moisture. This may be accomplished in various ways, for example, by simple air-drying the treated material spread in thin layers for a period of about 48 hours, by exposing to streams of hot air such as are obtained in mechanical convection ovens, by warming in a vacuum, or by purging with nitrogen or other inert gas.

The process of the invention is of wide versatility and can be employed to lower aflatoxin levels in materials of all kinds which are contaminated with these toxins. The invention is particularly useful in the treatment or agricultural products—of animal or plant origin—since such materials are especially likely to become contaminated with the *A. flavus* mold when exposed to condition conducive to mold growth. Typical examples of such materials in category of vegetative cellular materials are seeds and the residues remaining after extraction of oil therefrom, e.g., peanuts, soybeans, cottonseed, peanut meal, soybean meal, cottonseed meal, flaxseed meal; grains such as wheat, barley, rice, rye, oats, corn, and meals or flours prepared from any of these grains; forages such as alfalfa, clover, grasses, sorghum, bran, cowpeas, ensilage, mixed feeds, etc. Other examples of agricultural products include such materials as fish meal, tankage, dried blood, distillery and brewery residues, dried whey, etc.

The invention is further demonstrated by the following examples:

EXAMPLE 1

The starting material was a sample of flasked cottonseed meats known to be contaminated with aflatoxins. Chemical assay of this material indicated 760 p.p.b. total aflatoxin. Several 200 gram portions of these flaked meats were weighed into polyethylene sacks, and to each sack was added 11.2 grams of water and 10.0 grams of a 25% aqueous solution of methyl amine. Based upon the flakes used, these addition elevated the moisture level to 15%, and supplied 1.25% anhydrous methyl amine. After sealing, the contents of each sack were thoroughly mixed, and all sacks were allowed to stand at room temperature. At various intervals, the sacks were opened and their contents dried in a mechanical convection oven (about 60° C.) to approximately original weight. The dried materials were assayed for aflatoxins.

The results obtained are tabulated below:

| Days at room temperature: | Total aflatoxin, p.p.b. |
| --- | --- |
| 0 | 760 |
| 2 | 520 |
| 7 | 433 |

EXAMPLE 2

The starting material was the aflatoxin-contaminated lot of flaked cottonseed meats described in Example 1. In these treatments, 700 gram portions of the flakes were heated for 120 minutes at 100° C. in the presence of added water and 25% aqueous methyl amine. The additions were adjusted so that, based on the weight of flakes used, the moisture content was 15% in each treatment, while the content of anhydrous methyl amine varied for each treatment. The treatments were performed in a bench-scale reactor, provided with a suitable cover and a reflux condenser vented to a hood. The reactor was equipped with an agitator, and heat was applied by means of a steam jacket. After treatment, the materials were spread in thin layers and allowed to air-dry for 48 hours.

The results obtained are tabulated below:

| Treatment No. | Methyl amine, percent | Total aflatoxin, p.p.b. |
| --- | --- | --- |
| None; original flakes | | 760 |
| 1 | 0.32 | 130 |
| 2 | 0.63 | 65 |
| 3 | 1.25 | 5 |

EXAMPLE 3

The starting material was a lot of aflatoxin-contaminated cottonseed meal of domestic commercial origin. Chemical assay of this material revealed 200 p.p.b. total aflatoxin content. Employing the bench-scale reactor described in Example 2, 700 grams of this meal was treated with sufficient added water and 25% aqueous methyl amine to supply, based on the weight of meal used, 15% moisture and 1.25% anhydrous methyl amine. After 2 hour treatment at 100° C., the treated material was air-dried at ambient temperature for 48 hours. Chemical assay indicated only 14 p.p.b. aflatoxin in the product.

EXAMPLE 4

The starting material was an aflatoxin-contaminated peanut meal of domestic commercial origin. Analysis of this meal was as follows: Moisture, 7.25%; lipids, 0.75% (MFB); nitrogen, 9.82% (MFB); crude fiber, 5.0% (MFB); ash, 5.34% (MFB); nitrogen solubility (in 0.02 N NaOH), 82.4%; available lysine, 2.78 grams per 16 grams meal nitrogen; total aflatoxin, 110 p.p.b.

This meal was treated with methyl amine in a steam-jacketed pilot plant-scale reactor very similar to the bench-scale reactor described in Example 2 except that the capacity of the pilot-plant reactor was much greater.

A 6.82 kilogram portion of the peanut meal was blended in a large food mixer with sufficient water and 40% aqueous methyl amine solution to supply, based on the weight of the meal, 30% moisture and 1.25% anhydrous methyl amine. After blending for 10 minutes, the mixture was transferred to the preheated about 50° C.) pilot plant-scale reactor. The temperature of the mixture was elevated to 100° C. in the reactor and maintained at this value for 90 minutes. The mixture was spread in thin layers and allowed to air-dry at ambient temperature for 48 hours, and then subjected to a further one-hour period of drying in a mechanical convection oven operating at about 50° C.

Analysis of the treated peanut meal was as follows: Moisture, 8.86%; lipids, 0.26% (MFB); nitrogen, 10.75% (MFB); crude fiber, 4.9% (MFB); ash, 5.41% (MFB); nitrogen solubility (in 0.02 N NaOH), 60.5%; available lysine, 2.41 grams per 16 grams meal nitrogen. Total aflatoxin, trace (less than 2 p.p.b.).

The untreated aflatoxin-contaminated peanut meal and the methyl amine-treated peanut meal were each fed to 10 ducklings as 60% of the diet for two weeks. Weights of the ducklings were determined after one and two weeks and the livers removed for histopathological examination.

The mean duckling weights are given in the following table:

| Meal | Mean body weight, grams | |
| --- | --- | --- |
| | 1 week | 2 weeks |
| Untreated, aflatoxin-contaminated | 163 | 501 |
| Methyl amine-treated | 156 | 447 |

Thus, the methyl amine-treated peanut meal was only slightly less efficient in promoting growth in the ducklings.

Histopathological results associated with aflatoxicosis were present in 4 of 10 livers from the ducklings fed the untreated, aflatoxin-contaminated peanut metal. The lesions were well defined but not extensive or severe. They could be considered 1+.

The methyl amine-treated meal did not produce any observable liver damage in the ducklings, thus verifying biologically the conclusions derived from chemical assay for aflatoxin.

Rat feeding tests were performed to determine the protein quality of these materials. The untreated, aflatoxin-contaminated peanut meal and the methyl amine-treated meal were each fed for 10 days to five weanling female rats at a level of 10% protein. Protein efficiency ratios (PER) were determined as average values corrected to compare with casein as a control at PER 2.50. Protein retention efficienciees (PRE) are calculated net protein utilization (NPU) values, based on feeding tests but without analysis of the rat carcass for its nitrogen content.

The data obtained are summarized in the following table:

| Test diet | Protein efficiency ratio (PER) corrected | Protein retention efficiency (PRE) |
|---|---|---|
| Casein control | 2.50 | 68.96 |
| Untreated, aflatoxin-contaminated peanut meal | 1.82 | 52.48 |
| Methyl amine-treated peanut meal | 1.31 | 42.88 |

These data indicate that the methyl amine treated meal has retained the bulk of the protein value of the original untreated meal.

Having thus disclosed the invention, what is claimed is:

1. A process for lowering the aflatoxin level in an agricultural product having an aflatoxin contamination of about from 110 to 760 p.p.b. and selected from the group consisting of cottonseed meal and peanut meal, comprising:
   (a) establishing a moisture content of about from 15% to 30% in said agricultural product;
   (b) mixing the product from (a) with about from 0.6% to 1.5%, based on the weight of said product, of primary methyl amine having the formula $CH_3NH_2$; and
   (c) maintaining the mixture from (b) at a temperature of about from 75° C. to 100° C. until the level of aflatoxin, as measured by chemical assay, ranges from about 3 to about 14 p.p.b.

2. The process of claim 1 wherein the aflatoxin-contaminated agricultural product is cottonseed meal.

3. The process of claim 1 wherein the aflatoxin-contaminated agricultural product is peanut meal.

References Cited

UNITED STATES PATENTS

| | | | |
|---|---|---|---|
| 2,723,198 | 11/1955 | Pensack | 99—2 |
| 3,067,092 | 12/1962 | Felchtinger | 424—325 |
| 3,259,501 | 7/1966 | Ulrey | 99—2 |
| 3,497,601 | 2/1970 | Werres et al. | 424—325 |

NORMAN YUDKOFF, Primary Examiner

C. P. RIBANDO, Assistant Examiner

U.S. Cl. X.R.

99—225